US008671801B2

(12) United States Patent
Oki (10) Patent No.: US 8,671,801 B2
(45) Date of Patent: Mar. 18, 2014

(54) POWER TRANSMISSION APPARATUS FOR HYBRID VEHICLE

(75) Inventor: Shogo Oki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/420,489

(22) Filed: Mar. 14, 2012

(65) Prior Publication Data

US 2012/0234135 A1    Sep. 20, 2012

(30) Foreign Application Priority Data

Mar. 17, 2011  (JP) ................................. 2011-058906

(51) Int. Cl.
*F16H 37/06*      (2006.01)

(52) U.S. Cl.
USPC ............. 74/661; 74/664; 74/665 A; 74/665 P (58) Field of Classification Search
USPC .................. 74/661, 664, 665 A, 665 L, 665 P
See application file for complete search history.

(56) References Cited

U.S. PATENT DOCUMENTS

| 5,433,282 A * | 7/1995 | Moroto et al. ............. 180/65.21 |
| 5,823,282 A * | 10/1998 | Yamaguchi ............. 180/65.235 |
| 8,167,078 B2 * | 5/2012 | Futahashi et al. ............. 180/306 |
| 2002/0084118 A1 * | 7/2002 | Esaki ........................... 180/65.2 |
| 2006/0009323 A1 * | 1/2006 | Zhang ................................ 475/5 |

FOREIGN PATENT DOCUMENTS

| JP | 2004-011819 A | 1/2004 |
| JP | 2007-261348 A | 10/2007 |

* cited by examiner

*Primary Examiner* — Ha D Ho
(74) *Attorney, Agent, or Firm* — McGinn IP Law Group, PLLC (57) ABSTRACT

A power transmission apparatus includes a first one-way clutch disposed between a motor output shaft of an electric motor and a primary shaft, and a second one-way clutch disposed between an output transmission shaft coupled to a drive wheel and the motor output shaft. Using the motor output shaft as a reference, the two one-way clutches transmit torque in a single direction and do not transmit torque in the opposite direction. The one-way clutches are not operated using oil pressure, while power is not transmitted in a single direction in accordance with a torque magnitude. Therefore, a plurality of torque transmission paths are formed in the power transmission apparatus without the need for an oil pressure supply.

6 Claims, 5 Drawing Sheets

(A)
Forward travel, power running

(B)
Forward travel, regeneration

Fig. 3

(A)
Reverse travel, power running

M > P > T

(B)
Reverse travel, regeneration

(A)
Forward travel, power running

(B)
Forward travel, regeneration

Fig. 5

(A)
Reverse travel, power running

(B)
Reverse travel, regeneration

POWER TRANSMISSION APPARATUS FOR HYBRID VEHICLE

CROSS-REFERENCE TO RELATED APPLICATIONS

The present application claims priority from Japanese Patent Application No. 2011-058906, filed on Mar. 17, 2011, the entire contents of which are hereby incorporated by reference.

BACKGROUND OF THE INVENTION

1. Field of the Invention

The present invention relates to a power transmission apparatus for a hybrid vehicle in which an engine output and a motor output are transmitted to a drive wheel.

2. Description of the Related Art

In a hybrid vehicle that is installed with an engine and an electric motor so that an engine output and a motor output can be transmitted to a drive wheel, the engine output is transmitted to the drive wheel via a shift mechanism. In a hybrid vehicle installed with a shift mechanism, the engine and the electric motor may be arranged such that the engine is disposed on one end portion side of a transmission input shaft of the shift mechanism and the electric motor is disposed on the other end portion side, whereby the engine and the electric motor are disposed on either side of the shift mechanism, or such that the engine and the electric motor are disposed adjacent to each other on one end portion side of the transmission input shaft. In a hybrid vehicle having a shift mechanism, the engine output and the motor output are transmitted drive wheel via the shift mechanism. In a case where the electric motor is caused to function as a generator in order to recover regenerative energy, regenerative torque from the drive wheel is transmitted to the electric motor via the shift mechanism.

Japanese Unexamined Patent Application Publication (JP-A) No. 2004-11819 describes a hybrid vehicle in which a continuously variable transmission (CVT) is used as the shift mechanism, an engine is disposed on one end portion side of a primary shaft serving as the transmission input shaft, and an electric motor is disposed on the other end portion side. In this hybrid vehicle, an oil pump is driven by an electric motor for travel to generate oil pressure used by a power transmission mechanism. A reverse rotation prevention mechanism employing a planetary gear and a one-way clutch is provided between the electric motor and the oil pump such that when the vehicle is caused to reverse by rotating the electric motor in reverse, the oil pump is driven to rotate in an identical direction to a direction for forward advancement by the reverse rotation prevention mechanism.

JP-A No. 2007-261348 describes a hybrid vehicle in which a continuously variable transmission is used as a shift mechanism, and an engine and an electric motor are disposed adjacent to each other on one end portion side of a primary shaft. When this hybrid vehicle travels by transmitting an engine driving force to a drive wheel via the continuously variable shift mechanism, the driving force is prevented from being transmitted in reverse to the electric motor by a one-way clutch, and as a result, driving force loss caused by drag in the electric motor can be prevented from occurring.

In the conventional hybrid vehicles described above, the engine output and the motor output are transmitted to the drive wheel via a shift mechanism, and therefore power transmission loss in the shift mechanism is inevitable. When the electric motor is caused to serve as a generator order to recover regenerative energy, regenerative torque from the drive wheel is transmitted to the electric motor via the shift mechanism, leading to further power transmission loss.

Examples of the continuously variable shift mechanism serving as the shift mechanism include a belt drive type mechanism and a traction drive type mechanism. In a belt drive system, a primary shaft having a primary pulley and a secondary shaft having a secondary pulley are provided, and groove widths of the respective pulleys are set to be variable. A power transmission element such as a belt is wound between the two pulleys, whereby rotation of the primary shaft is varied continuously via the power transmission element and transmitted to the secondary shaft. In a traction drive system, a primary shaft having an input disk and a primary shaft having an output disk are provided, a toroidal surface is formed on each of the disks, and a power roller is disposed between the toroidal surfaces as a power transmission element.

In the continuously variable shift mechanism, a tightening force oriented toward the belt or other power transmission element must be exerted on the pulleys using a hydraulic pump during power transmission. Likewise in a stepped shift mechanism, oil pressure supplied from a hydraulic pump to frictional engagement elements such as a clutch and a brake for switching a gear position in order to drive the clutch and so on. Hence, in a power transmission apparatus for a hybrid vehicle employing a shift mechanism, a hydraulic pump for driving the shift mechanism must be driven, and therefore, in addition to the power transmission loss occurring the shift mechanism, power loss inevitably occurs when driving the hydraulic pump.

SUMMARY OF THE INVENTION

An object of the present invention is to improve a power transmission efficiency of a hybrid vehicle.

An aspect of the present invention provides a power transmission apparatus for a hybrid vehicle that transmits an engine output and a motor output to a drive wheel, the power transmission apparatus including: a shift mechanism having a transmission input shaft coupled to an engine output shaft and a transmission output shaft to which a rotation of the transmission input shaft is transmitted after being shifted via a power transmission element; a first one-way clutch disposed between one end portion of a motor output shaft of an electric motor and the transmission input shaft in order to transmit torque in a single direction between the motor output shaft and the transmission input shaft; and a second one-way clutch disposed between an output transmission shaft coupled to the drive wheel and the other end portion of the motor output shaft in order to transmit torque in a single direction between the motor output shaft and the power transmission shaft. In the power transmission apparatus for a hybrid vehicle, a plurality of torque transmission paths are formed between the electric and the drive wheel via the two one-way clutches.

Preferably, the first one-way clutch should transmit torque from the motor output shaft to the transmission input shaft and block torque transmission in an opposite direction, the second one-way clutch should transmit torque from the output transmission shaft to the motor output shaft and block torque transmission in an opposite direction, and a regenerative braking torque and the motor output should be transmitted to the electric motor during forward travel and to the drive wheel during reverse travel, respectively, via the second one-way clutch without passing through the shift mechanism. Preferably, the first one-way clutch should transmit torque from the transmission input shaft to the motor output shaft and block torque transmission in an opposite direction, the second one-way clutch should transmit torque from the motor output shaft to the output transmission shaft and block torque transmission in an opposite direction, and the motor output and a regenerative braking torque should be transmitted to the drive wheel during forward travel and to the electric motor during reverse travel, respectively, via the second one-way clutch without passing through the shift mechanism. Preferably, the output transmission shaft should include: a transfer shaft that is coupled to the second one-way clutch so as to be coaxial with the motor output shaft; a rear wheel output shaft that is coupled to the transfer shaft via a transfer clutch in order to transmit power to a rear wheel; and a front wheel output shaft that is coupled to the transfer shaft in order to transmit power to a front wheel.

In the power transmission apparatus according to the present invention, a plurality of torque transmission paths are formed between the engine output shaft and motor output shaft and the drive wheel by the two one-way clutches disposed on the respective end portions of the motor output shaft, and therefore the torque transmission path can be switched without using a hydraulic clutch. As a result, the need to activate an oil pump to switch the torque transmission path is eliminated, making it unnecessary to use an electric oil pump to switch the torque transmission path when the engine is stopped.

The motor output shaft of the electric motor is directly coupled to the output transmission shaft, and therefore the motor output can be transmitted to the drive wheel without activating the shift mechanism. When the shift mechanism is not activated, there is no need to supply oil pressure to the shift mechanism, and therefore power transmission loss can be eliminated. When recovering the regenerative braking energy, the torque from the drive wheel can be transmitted directly to the electric motor without passing through the shift mechanism, and therefore regenerative energy can be recovered efficiently without power transmission loss.

DESCRIPTION OF THE PREFERRED EMBODIMENT

An embodiment of the present invention will be described below in detail on the basis of the drawings. A power transmission apparatus shown in FIG. 1 includes a continuously variable transmission 10 serving as a shift mechanism. The continuously variable transmission 10 includes a primary shaft 11 serving as a transmission input shaft and a secondary shaft 12 serving as a transmission output shaft. The primary shaft 11 and the secondary shaft 12 are parallel to each other. The continuously variable transmission 10 is incorporated into a transmission case 13a, and the transmission case 13a is installed vertically in an unillustrated vehicle body so that the primary shaft 11 and the secondary shaft 12 are each parallel to a travel direction.

Figure 1:
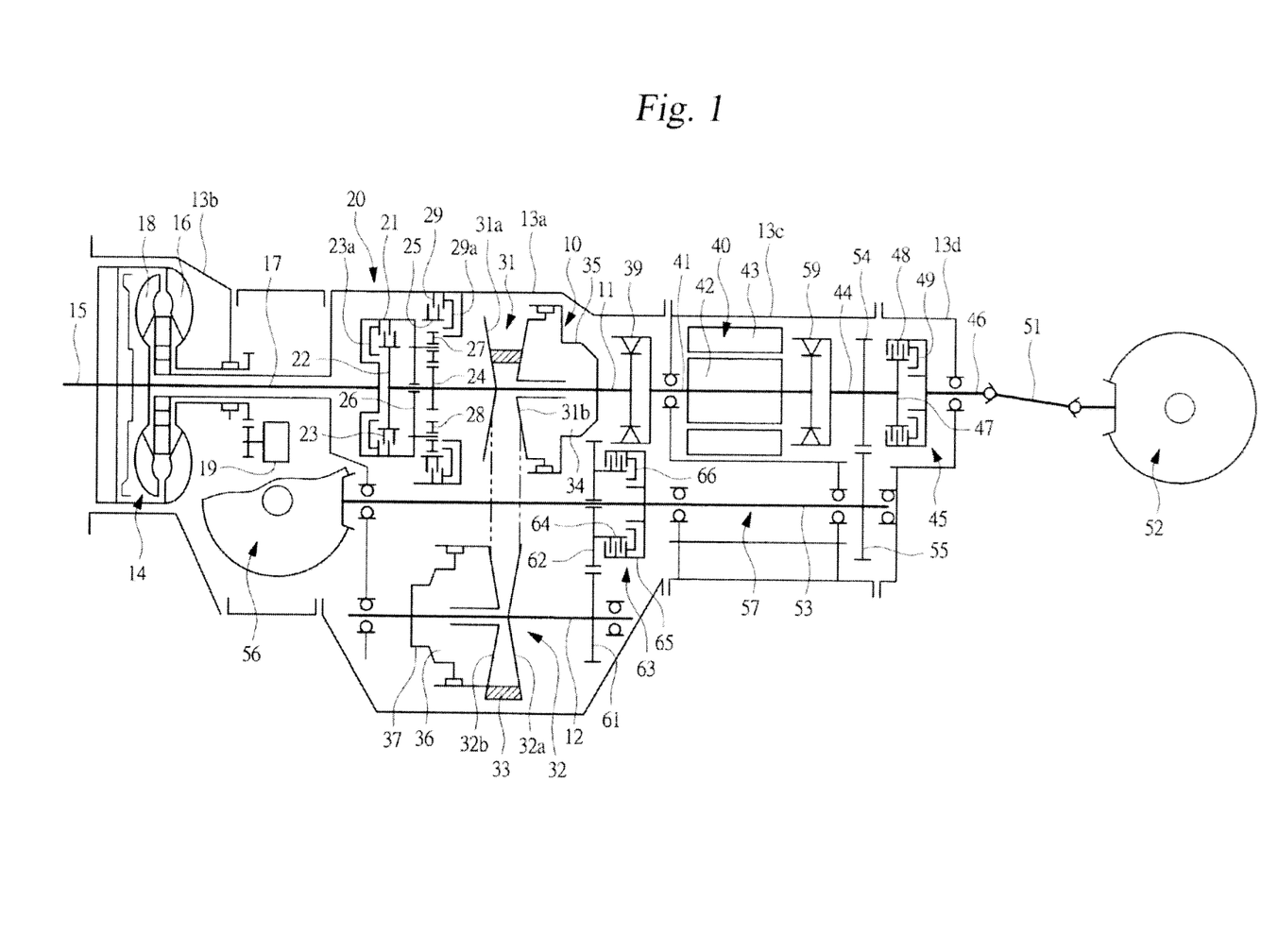
FIG. 1 is a skeleton diagram showing power transmission apparatus for a hybrid vehicle according to an embodiment of the present invention.

A torque converter 14 is incorporated into a converter case 13b attached to a tip end portion of the transmission case 13a. The torque converter 14 includes a pump impeller 16 coupled to a crankshaft of an unillustrated engine or in other words an engine output shaft 15, and a turbine runner 18 that faces the pump impeller 16 and is coupled to a turbine shaft 17. The power transmission apparatus includes an oil pump 19, and the oil pump 19 is driven by a pump shaft provided in the pump impeller 16 of the torque converter 14. The turbine shaft 17 of the torque converter 14 is coupled to one end portion of the primary shaft 11 by a forward-reverse changeover mechanism 20.

The forward-reverse changeover mechanism 20 includes a clutch drum 21 fixed to the turbine shaft 17 and a clutch hub 22 fixed to the primary shaft 11. A forward clutch 23 is formed by a plurality of friction plates disposed between the clutch drum 21 and the clutch hub 22. When the forward clutch 23 is engaged by a hydraulic on 23a, rotation of the turbine shaft 17 is transmitted to the primary shaft 11 via the clutch hub 22 such that the primary shaft 11 rotates in an identical normal rotation direction to the turbine shaft 17. A sun gear 24 is fixed to the primary shaft 11, and a ring gear 25 is provided in the transmission case 13a to be free to rotate on a radial direction outer side of the sun gear 24. Two planetary pinion gears 27 and 28 that mesh with each other to form a pair are mounted to be free to rotate on a carrier 26 attached to the clutch drum 21. One of the pinion gears 27 meshes with the sun gear 24, while the other pinion gear 28 meshes with the ring gear 25. Note that in FIG. 1, the two pinion gears 27 and 28 are shown at a remove from each other to facilitate creation of the drawing. A reverse brake 29 is formed by a plurality of friction plates disposed between the ring gear 25 and the transmission case 13a. When the reverse brake 29 is engaged by a hydraulic piston 29a while the forward clutch 23 is disengaged, the primary shaft 11 rotates in an opposite rotation direction to the turbine shaft 17. When the primary shaft 11 is rotated in the normal rotation direction, the reverse brake 29 is set in a disengaged state.

As shown in FIG. 1, the primary shaft 11 is coupled by one end portion thereof to the engine output shaft 15 via the torque converter 14 and the forward-reverse changeover mechanism 20, whereby an engine output is input into the primary shaft 11.

A primary pulley 31 is provided on the primary shaft 11 of the continuously variable transmission 10. The primary pulley 31 includes a fixed pulley 31a fixed to the primary shaft 11, and a movable pulley 31b that opposes the fixed pulley 31a and is mounted on the primary shaft 11 to be free to slide in an axial direction via a ball spline or the like. Thus, an interval between conical surfaces of the pulleys, or in other words a pulley groove width, is made variable. A secondary pulley 32 is provided on the secondary shaft 12 parallel to the primary shaft 11. The secondary pulley 32 includes a fixed pulley 32a fixed to the secondary shaft 12, and a movable pulley 32b that opposes the fixed pulley 32a and is mounted on the secondary shaft 12 to be free to slide in the axial direction via a ball spline or the like, whereby the pulley groove width thereof is made variable.

A belt 33 is wound between the primary pulley 31 and the secondary pulley 32 as a power transmission element. By varying the groove widths of the two pulleys 31 and 32, a winding diameter ratio of the belt 33 relative to the respective pulleys 31 and 32 is varied. As a result, a rotation speed of the secondary pulley 12 relative to the primary pulley 11 is shifted continuously. To vary the groove width of the primary pulley 31, a cylinder 35 that forms a primary oil chamber 34 together with the movable pulley 31b is attached to the primary shaft 11. To vary the groove width of the secondary pulley 32, a cylinder 37 that forms a secondary oil chamber 36 together with the movable pulley 32b is attached to the secondary shaft 12. Working oil is supplied to the primary oil chamber 34 and the secondary oil chamber 36 from the oil pump 19.

An electric motor 40 is mounted in a motor case 13c attached to a rear end portion of the transmission case 13a. The electric motor 40 includes a rotor 42 attached to a motor output shaft 41, and the motor output shaft 41 is coupled to a first one-way clutch 39 on another end portion of the primary shaft 11. The electric motor 40 includes a stator 43, in the interior of which the rotor 12 is incorporated, and the stator 43 is fixed to the motor case 13c. Thus, the primary shaft 11 is coupled to the engine output shaft 15 at a left end portion of FIG. 1 via the torque converter 14 and the forward-reverse changeover mechanism 20, and coupled to the motor output shaft 41 of the electric motor 40 at a right end portion via the one-way clutch 39. Thus, the turbine shaft 17, the primary shaft 11, and the motor output shaft 41 are coaxial. The electric motor 40 is a motor/generator that serves not only as an electric motor but also as a power generator for recovering regenerative energy during braking and charging a battery therewith.

The power transmission apparatus shown in FIG. 1 is installed in an all-wheel drive vehicle, or in other words a four-wheel drive type vehicle, in which both front wheels and rear wheels serve as drive wheels such that power can be transmitted thereto. A transfer case 13d is attached to a rear end portion of the motor case 13c. A transfer clutch 45 is attached to a transfer shaft 44 that is disposed in the motor case 13c so as to project into the transfer case 13d, and the transfer shaft 44 is coupled to a rear wheel output shaft 46 by the transfer clutch 45. The transfer clutch 45 includes a clutch hub 47 attached to the transfer shaft 44 and a clutch drum 48 attached to the rear wheel output shaft 46, and a plurality of friction plates are provided therebetween. When the friction plates engaged by a piston 49, the transfer shaft 44 and the rear wheel put shaft 46 are coupled. The rear wheel output shaft 46 is coupled to a rear differential mechanism 52 by a propeller shaft 51 such that an output is transmitted from the transfer shaft 44 to the unillustrated rear wheels serving as drive wheels via the propeller shaft 51.

A front wheel output shaft 53 is mounted in the transmission case 13a to be parallel to the primary shaft 11 and the secondary shaft 12. The front wheel output shaft 53 is coupled to the transfer shaft 44 by a gear pair constituted by a gear 54 attached to the transfer shaft 44 and a gear 55 attached to the front wheel output shaft 53 so as to mesh with the gear 54. The front wheel output shaft 53 is coupled to a front differential mechanism 56 such that an output is transmitted from the transfer shaft 44 to the unillustrated front wheels serving as drive wheels via the front wheel output shaft 53. When the transfer clutch 45 is engaged, the engine output and so on is transmitted to the front wheels and the rear wheels. When the transfer clutch 45 is disengaged, on the other hand, the engine output and so on is transmitted only to the front wheels.

The transfer shaft 44, the rear wheel output shaft 46, and the front wheel output shaft 53 together constitute an output transmission shaft 57 for transmitting power to the front wheels and rear wheels serving as the drive wheels. To transmit the rotation of the secondary shaft 12 to the output transmission shaft 57, a gear 61 attached to the secondary shaft 12 meshes with a gear 62 mounted to be free to rotate on the front wheel output shaft 53. An output clutch 63 for switching the output transmission shaft 57 and the secondary shaft 12 between a coupled state in which the two shafts are coupled and a released state in which the coupling is released is disposed between the gear 62 and the front wheel output shaft 53. The output clutch 63 includes a clutch hub 64 attached to the gear 62 and a clutch drum 65 attached to the front wheel output shaft 53, and a clutch plate is provided therebetween. When the clutch plate is engaged by a hydraulic piston 66, the secondary shaft 12 and the output transmission shaft 57 enter the coupled state.

Working oil from the oil pump 19, which is driven by the engine, is supplied to the primary oil chamber 34, the secondary oil chamber 36, the hydraulic pistons 66 and 49, and so on. However, an electric oil pump may be attached to the power transmission apparatus instead of or in addition to the engine-driven oil pump 19.

FIG. 1 shows an all-wheel drive type power transmission apparatus, but in the case of an FF type power transmission apparatus in which only the front wheels serve as the drive wheels, the transfer clutch 45 is removed. Meanwhile, in the case of an FR type power transmission apparatus in which only the rear wheels serve as the drive wheels, the transfer clutch 45 and the front wheel output shaft 53 are removed, while the secondary shaft 12 is coupled to the rear wheel output shaft 46 via a gear and a chain.

Another end portion of the motor output shaft 41 is coupled to the transfer shaft 41 by a second one-way clutch 59. Thus, the electric motor 10 is coupled to the primary shaft 11 by the first one-way clutch 39 disposed between the one end portion of the motor output shaft 41 and the primary shaft 11 serving as the transmission input shaft, and coupled to the output transmission shaft 57 by the second one-way clutch 59 disposed between the other end portion of the motor output shaft 41 and the output transmission shaft 57.

When a torque transmission direction of the first one-way clutch 39 is set in a direction heading from the electric motor 40 toward the primary shaft 11 during forward vehicle travel, a torque transmission direction of the second one-way clutch 59 during forward travel is set in a direction heading from the drive wheel, or in other words the output transmission shaft 57, toward the electric motor 40. In so doing, torque transmission in opposite directions is prevented. During reverse travel, the torque transmission directions of the one-way clutches 39 and 59 are opposite to those of forward travel.

Conversely, when the torque transmission direction of the first one-way clutch 39 is set in a direction heading from the primary shaft 11 toward the electric motor 40 during forward vehicle travel, the torque transmission direction of the second one-way clutch 59 during forward travel is set in a direction heading from the electric motor 40 toward the output transmission shaft 57. In so doing, torque transmission in opposite directions is prevented. During reverse travel, the torque transmission directions of the way clutches 39 and 59 are opposite to those of forward travel.

Figure 2:
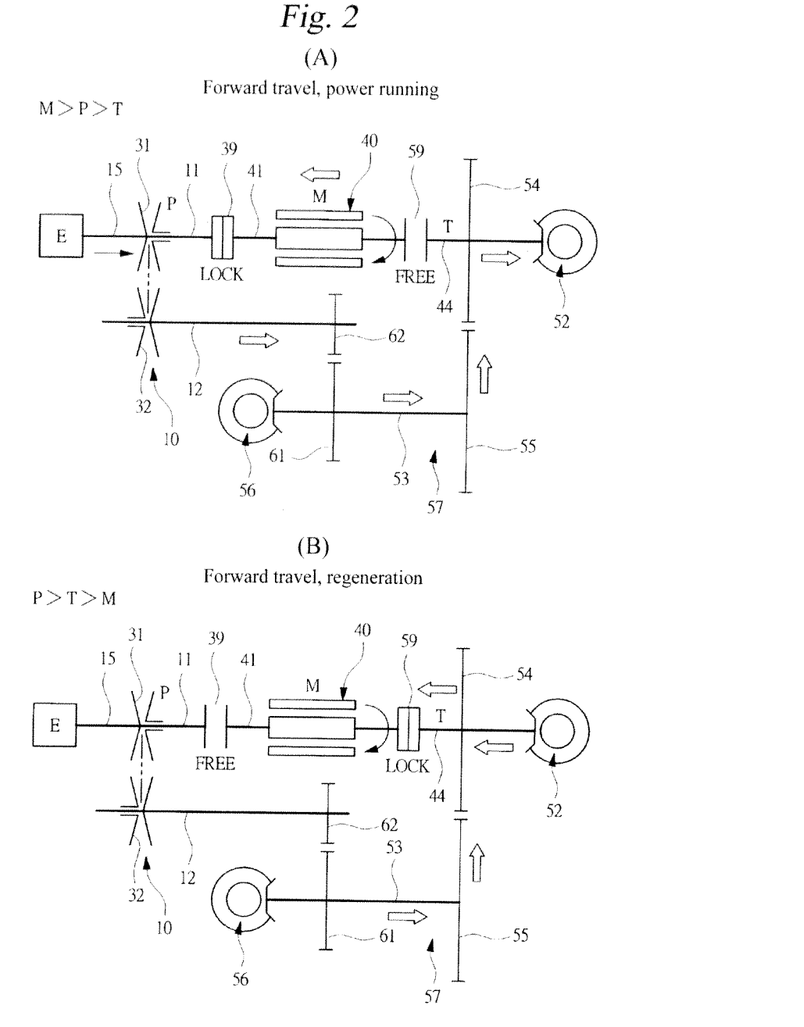
FIG. 2A is a schematic diagram showing a torque transmission path an electric motor to an output transmission shaft when a vehicle travels forward in a first clutch operation mode.
FIG. 2B is a schematic diagram showing a torque transmission path during regenerative braking.
Figure 3:
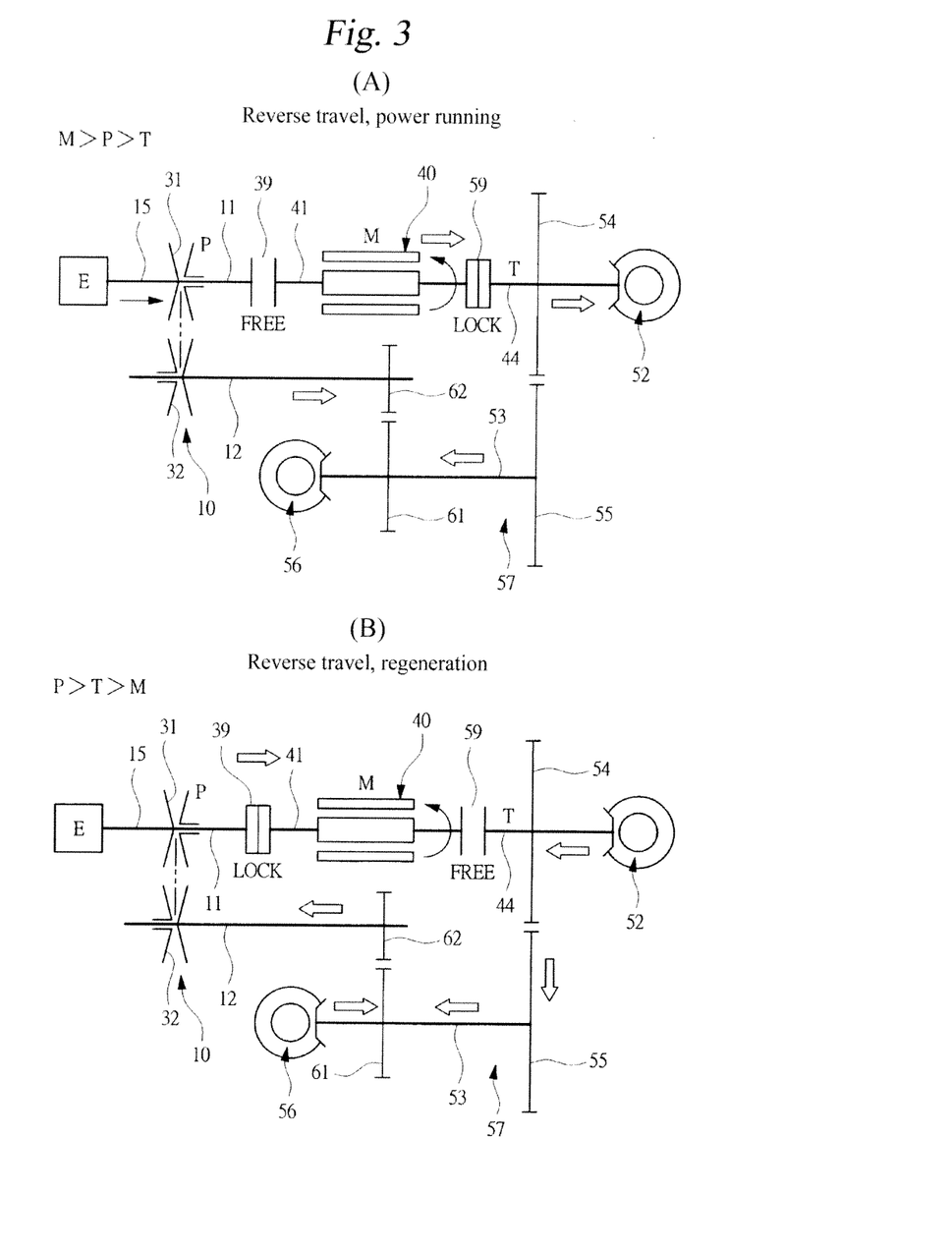
FIG. 3A is a schematic diagram showing a torque transmission path from the electric motor to the output transmission shaft when the vehicle travels in reverse in the first clutch operation mode.
FIG. 3B is a schematic diagram showing a torque transmission path during regenerative braking.

Hence, using the motor output shaft 41 of the electric motor 40 as a reference, the two one-way clutches 39 and 59 transmit torque in a single direction of the motor output shaft 41 at all times, and do not transmit torque in the opposite direction. An operation mode in which power transmission is performed in a power running direction of the electric motor 40 during forward travel by the two one-way clutches 39 and 59, or in other words the motor output generated by the electric motor 40 is transmitted to the primary shaft 11 and regenerative torque is transmitted directly to the motor output shaft 41 from the drive wheel during regeneration, is set as a first clutch operation mode, and FIG. 2 shows corresponding torque transmission path patterns in this case. Torque transmission path patterns when the vehicle is caused to travel in reverse in the first clutch operation mode are shown in FIG. 3.

Figure 4:
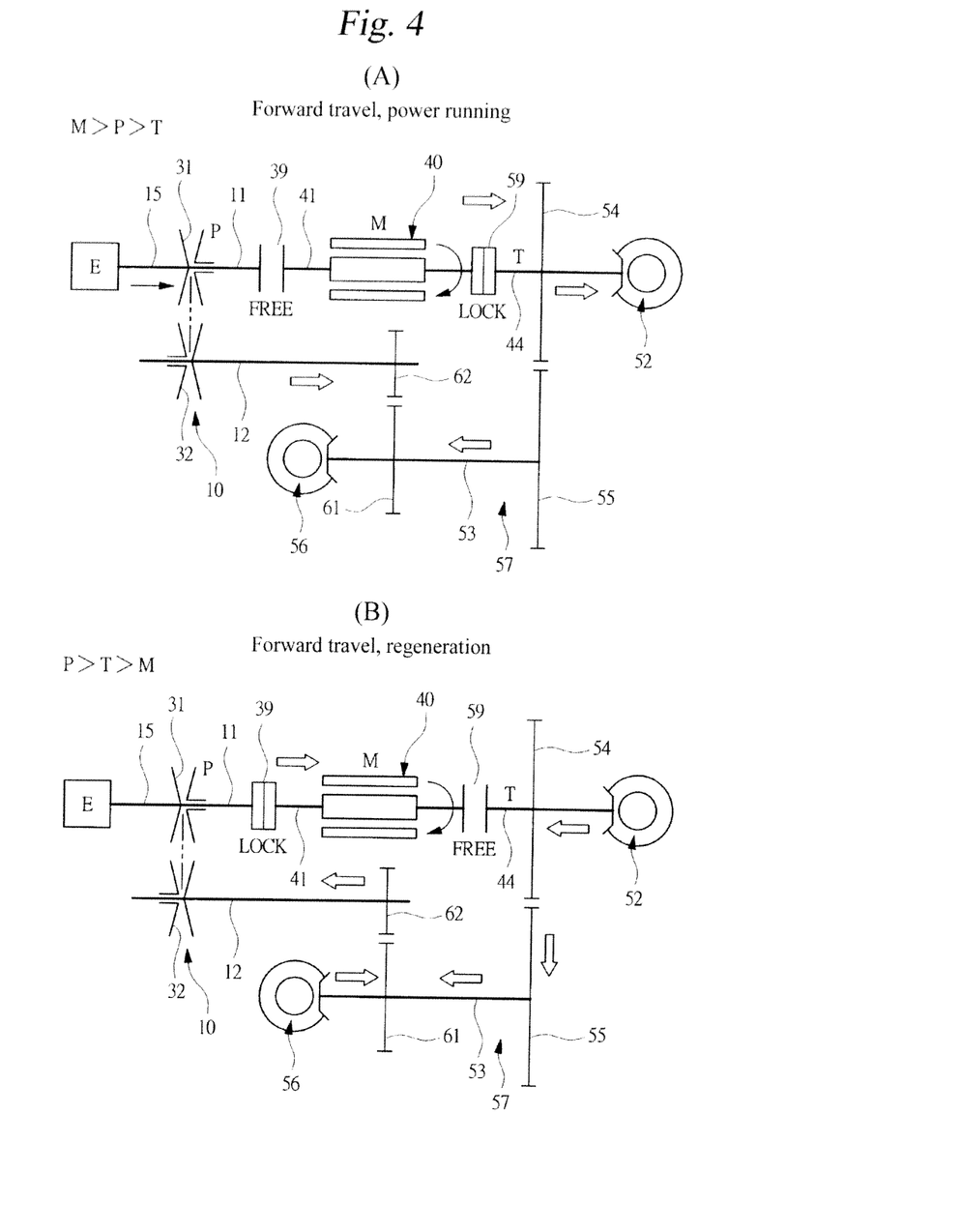
FIG. 4A is a schematic diagram showing a torque transmission path from the electric motor to the output transmission shaft when the vehicle travels forward in a second clutch operation mode.
FIG. 4B is a schematic diagram showing a torque transmission path during regenerative braking.
Figure 5:
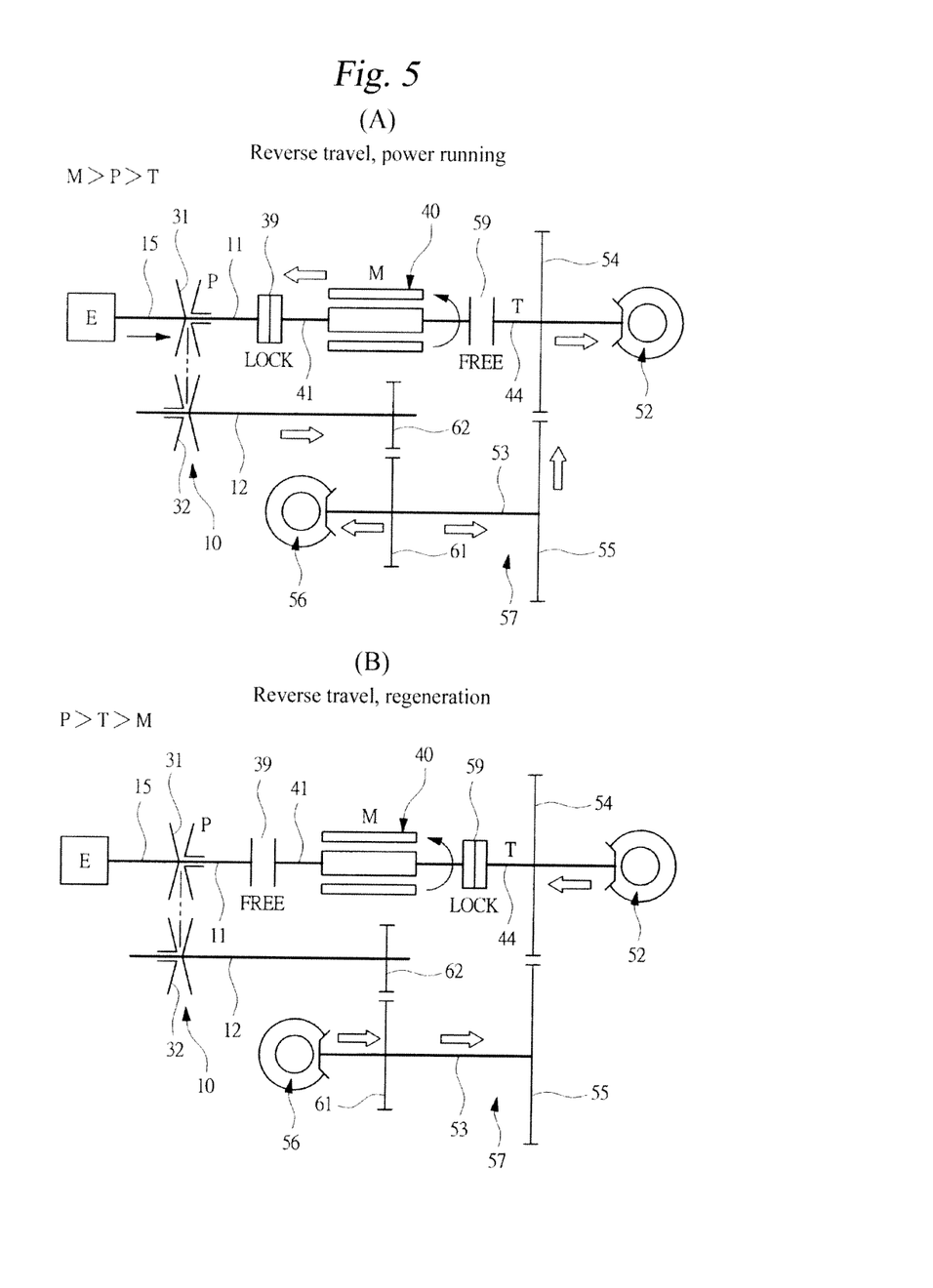
FIG. 5A is a schematic diagram showing a torque transmission path from the electric motor to the output transmission shaft when the vehicle travels in reverse in the second clutch operation mode.
FIG. 5B is a schematic diagram showing a torque transmission path during regenerative braking.

Meanwhile, an operation mode in which power transmission is performed in the power running direction of the electric motor 40 during forward travel by the two one-way clutches 39 and 59, or in other words the motor output generated by the electric motor 40 is transmitted directly to the output transmission shaft 57 and regenerative torque is transmitted to the motor output shaft 41 from the drive wheel via the continuously variable transmission 10 during regeneration, is set as a second clutch operation mode, and FIG. 4 shows corresponding torque transmission path patterns in this case. Torque transmission path patterns when the vehicle is caused to travel in reverse in the second clutch operation mode are shown in FIG. 5.

Reference symbols P, M and T and inequality signs in FIGS. 2 to 5 denote torque magnitude relationships based on rotation speed differences between the primary shaft 11, the electric motor 40, and the transfer shaft 44. Higher rotation speed values and larger torque values are located on an upstream side of the torque transmission path.

The first clutch operation mode will now be described with reference to FIGS. 2 and 3. FIG. 2 shows the torque transmission path when the vehicle travels forward, and FIG. 3 shows the torque transmission path when the vehicle travels in reverse.

As shown in FIG. 2A, in the first clutch operation mode, the primary shaft 11 is driven to rotate in a forward direction by the engine, and the motor output shaft 41 is driven to rotate in the forward direction. When, in this condition, an output torque M of the electric motor 40 increases beyond a torque P of the primary shaft 11, the motor output shaft 41 shifts to the upstream side of the primary shaft 11, and therefore, as shown by thick arrows, the electric motor 40 enters a power running mode relative to the primary shaft 11 such that the motor output is transmitted to the primary shaft 11. At this time, the torque M of the electric motor 40 is larger than a torque T of the transfer shaft 44, and therefore the second one-way clutch 59 does not transmit power from the motor output shaft 41 to the transfer shaft 44.

Hence, as shown in FIG. 2A, the motor output is transmitted to the output transmission shaft 57 via the continuously variable transmission 10, whereby both the engine output and the motor output are transmitted to the drive wheel via the continuously variable transmission 10. Moreover, a desired shift ratio can be selected using the continuously variable transmission 10, and therefore travel can be performed such that a required driving force is satisfied. If the engine is stopped at this time, only the motor output is transmitted to the drive wheel, and if the electric motor 40 is stopped, only the engine output is transmitted to the drive wheel. When the electric motor 40 is stopped, the first one-way clutch 39 enters a free condition, or in other words an unlocked condition, while the second one-way clutch 59 enters a locked condition, and as a result, the motor output shaft 41 is spun by the transfer shaft 44.

When, in the power transmission condition shown in FIG. 2A, the rotation speed of the transfer shaft 44 increases beyond that of the motor output shaft 41 such that the transfer shaft 44 shifts to the upstream side of the motor output shaft 41, torque circulation occurs. By disengaging the output clutch 63 at this time, torque circulation can be prevented. Note that torque circulation can also be prevented by setting the shift ratio of the continuously variable transmission 10 such that the rotation speed of the transfer shaft 44 does not exceed the rotation speed of the motor output shaft 41.

FIG. 2B shows the torque transmission path when the vehicle travels forward and the electric motor 40 is caused to generate power through regenerative braking. When regenerative braking is performed first clutch operation mode, the transfer shaft 44 rotates at a slightly higher rotation speed than the motor output shaft 41, and therefore braking torque is transmitted to the motor output shaft 41 via the second one-way clutch 59, as indicated by a thick arrow. At this time, the primary shaft 11 rotates at a slightly higher rotation speed than the motor output shaft 41, and therefore the first one-way clutch 39 is disengaged. Hence, during regenerative braking, regenerative energy is transmitted directly to the motor output shaft 41 from the output transmission shaft 57 without passing through the continuously variable transmission 10, and therefore power transmission loss in the continuously variable transmission 10 does not occur during recovery of the braking energy. As a result, the regenerative energy can be recovered efficiently.

FIG. 3A shows a condition in which the primary shaft 11 is driven to rotate in a reverse direction by the engine and the motor output shaft 41 is driven to rotate in the reverse direction in the first clutch operation mode. When, in this condition, the output torque M of the electric motor 40 increases beyond the torque T of the transfer shaft 44, the motor output is transmitted to the drive wheel via the output transmission shaft 57. Hence, during reverse travel, the motor output is transmitted directly to the output transmission shaft 57 without passing through the continuously variable transmission 10, and therefore the vehicle can be reversed highly efficiently with no power transmission loss. Furthermore, the motor output shaft 41 and the output transmission shaft 57 can be directly coaled by the one-way clutch 59, and therefore the motor output can be transmitted to the drive wheel while the engine is stopped. Hence, the need to provide an electric motor for driving the oil pump when the engine is stopped can be eliminated. In the torque transmission path shown in FIG. 3A, the engine output can also be transmitted to the drive wheel. However, the shift ratio of the continuously variable transmission 10 is set to prevent the rotation speed of the transfer shaft 44 from increasing beyond the rotation speed of the motor output shaft 41, and therefore the transfer shaft 44 does not shift to the upstream side of the motor output shaft 41.

FIG. 3B shows the torque transmission path when the vehicle travels in reverse and the electric motor 40 is caused to generate power through regenerative braking in the first clutch operation mode. When regenerative braking is performed during reverse travel in the first clutch operation mode, the transfer shaft 44 rotates at a slightly higher rotation speed than the motor output shaft 41, and therefore the second one-way clutch 59 does not transmit torque from the transfer shaft 44 to the motor output shaft 41. Accordingly, the braking torque is transmitted to the motor output shaft 41 via the continuously variable transmission 10, as indicated by a thick arrow.

Next, the second clutch operation mode will be described with reference to FIGS. 4 and 5. FIG. 4 shows a torque transmission path when the vehicle travels forward, and FIG. 5 shows a torque transmission path when the vehicle travels in reverse.

As shown in FIG. 4A, in the second clutch operation mode, the primary shaft 11 is driven to rotate in the forward direction by the engine, and the motor output shaft 41 is driven to rotate in the forward direction. When, in this condition, the output torque M of the electric motor 40 increases beyond the torque T of the transfer shaft 44, the motor output shaft 41 shifts to the upstream side of the transfer shaft 44, and therefore the electric motor 40 enters a power running mode relative to the transfer shaft 44 such that the motor output is transmitted to the transfer shaft 44 via the second one-way clutch 59. At this time, a torque P of the primary shaft 11 is smaller than the output torque M of the electric motor 40, and therefore the first one-way clutch 39 does not transmit torque from the primary shaft 11 to the motor output shaft 41.

Hence, as shown in FIG. 4A, the motor output is transmitted to the output transmission shaft 57 via the second one-way clutch 59 such that the motor output is transmitted to the output transmission shaft 57 directly without passing through the continuously variable transmission 10. As a result, the vehicle can be caused to travel highly efficiently without power transmission loss in the continuously variable transmission 10. Furthermore, the motor output shaft 41 and the output transmission shaft 57 can be directly coupled by the one-way clutch 59, and therefore the motor output can be transmitted to the drive wheel while the engine is stopped. Hence, the need to provide an electric motor for driving the oil pump when the engine is stopped can be eliminated. On the other hand, the engine output can also be transmitted to the output transmission shaft 57 via the continuously variable transmission 10. However, the shift ratio of the continuously variable transmission 10 is set so as to prevent the rotation speed of the transfer shaft 44 from increasing beyond the rotation speed of the motor output shaft 41, and therefore the transfer shaft 44 does not shift to the upstream side of the motor output shaft 41. When the engine is stopped, only the motor output is transmitted to the drive wheel. Hence, the torque transmission path shown in FIG. 4A is similar to that of FIG. 3A, albeit in an opposite travel direction.

FIG. 4B shows the torque transmission path when the vehicle travels forward and the electric motor 40 is caused to generate power through regenerative braking in the second clutch operation mode. When regenerative braking is performed in the second clutch operation mode, the transfer shaft 44 rotates at a slightly higher rotation speed than the motor output shaft 41. As a result, the braking torque is transmitted to the electric motor 40 via the continuously variable transmission 10 and the first one-way clutch 39 while the second one-way clutch 59 remains disengaged, as indicated by thick arrows. Hence, the torque transmission path shown in FIG. 4B is similar to that of FIG. 3B, albeit in an opposite travel direction.

FIG. 5A shows a condition in which the motor output shaft 41 is driven to rotate in the reverse direction such that the vehicle travels in reverse in the second clutch operation mode. The torque transmission path at this time is similar to that of FIG. 2A, albeit in an opposite travel direction. When, in this condition, the output torque M of the electric motor 40 increases beyond the output torque P of the primary shaft 11, the motor output torque of the electric motor 40 is transmitted to the output transmission shaft 57 via the continuously variable transmission 10. At this time, similarly to the torque transmission path shown in FIG. 2A, both the engine output and the motor output can be transmitted to the drive wheel via the continuously variable transmission 10. When the engine is stopped, only the motor output is transmitted to the drive wheel, and when the electric motor 40 is stopped, only the engine output is transmitted to the drive wheel.

FIG. 5B shows the torque transmission path when the vehicle travels in reverse and the electric motor 40 is caused to generate power through regenerative braking in the second clutch operation mode. The torque transmission path at this time is similar to that of FIG. 2B, albeit in an opposite travel direction. When regenerative braking is performed during reverse travel in the second clutch operation mode, the transfer shaft 44 rotates at a slightly higher rotation speed than the motor output shaft 41, and therefore the second one-way clutch 59 is engaged so as to couple the transfer shaft 44 and the motor output shaft 41 to each other, whereby the braking torque is transmitted directly to the motor output shaft 11 without passing through the continuously variable transmission 10. As a result, when regenerative braking is performed during reverse travel, regenerative braking energy can be recovered highly efficiently without power transmission loss.

As shown in FIG. 1, the power transmission apparatus includes the first one-way clutch 39 disposed between one end portion of the motor output shaft 41 of the electric motor 40 and the primary shaft 11, and the second one-way clutch 59 disposed between the other end portion of the motor output shaft 41 and the output transmission shaft 57. As a result, a plurality of torque transmission paths are formed in the power transmission apparatus by the respective one-way clutches 39 and 59, which are operated without the need to supply oil pressure thereto. The torque transmission path can be switched by the one-way clutches 39 and 59, and therefore the vehicle can be started using power from the electric motor 40, that is, without the need to drive the engine in order to drive the oil pump 19.

The present invention is not limited to the embodiment described above, and may be subjected to various modifications within a scope that does not depart from the spirit thereof. For example, the continuously variable transmission 10 is used as the shift mechanism, but the present invention may also be applied to a vehicle in which a stepped shift mechanism is used as the shift mechanism. Further, the continuously variable transmission 10 shown in the drawings is a belt drive type mechanism, but a traction drive type mechanism may be used instead.

What is claimed is:

1. A power transmission apparatus for a hybrid vehicle that transmits an engine output and a motor output to a drive wheel, the power transmission apparatus comprising:
    a shift mechanism having a transmission input shaft coupled to an engine output shaft and a transmission output shaft to which a rotation of said transmission input shaft is transmitted after being shifted via a power transmission element;
    a first one-way clutch disposed between one end portion of a motor output shaft of an electric motor and said transmission input shaft in order to transmit torque in a single direction between said motor output shaft and said transmission input shaft; and
    a second one-way clutch disposed between an output transmission shaft coupled to said drive wheel and the other end portion of said motor output shaft in order to transmit torque in a single direction between said motor output shaft and said output transmission shaft,
    wherein a plurality of torque transmission paths are formed between said electric motor and said drive wheel by said two one-way clutches.

2. The power transmission apparatus for a hybrid vehicle according to claim 1, wherein said first one-way clutch transmits torque from said motor output shaft to said transmission input shaft and blocks torque transmission in an opposite direction;

wherein said second one-way clutch transmits torque from said output transmission shaft to said motor output shaft and blocks torque transmission in an opposite direction; and wherein a regenerative braking torque and said motor output are transmitted to said electric motor during forward travel and to said drive wheel during reverse travel, respectively, via said second one-way clutch without passing through said shift mechanism.

3. The power transmission apparatus for a hybrid vehicle according to claim 1, wherein said first one-way clutch transmits torque from said transmission input shaft to said motor output shaft and blocks torque transmission in an opposite direction;

wherein said second one-way clutch transmits torque from said motor output shaft to said output transmission shaft and blocks torque transmission in an opposite direction; and said motor output and a regenerative braking torque are transmitted to said drive wheel during forward travel and to said electric motor during reverse travel, respectively, via said second one-way clutch without passing through said shift mechanism.

4. The power transmission apparatus for a hybrid vehicle according to claim 1, wherein said output transmission shaft comprises:

a transfer shaft that is coupled to said second one-way clutch so as to be coaxial with said motor output shaft;

a rear wheel output shaft that is coupled to said transfer shaft via a transfer clutch in order to transmit power to a rear wheel; and a front wheel output shaft that is coupled to said transfer shaft in order to transmit power to a front wheel.

5. The power transmission apparatus for a hybrid vehicle according to claim 2, wherein said output transmission shaft comprises:

a transfer shaft that is coupled to said second one-way clutch so as to be coaxial with said motor output shaft;

a rear wheel output shaft that is coupled to said transfer shaft via a transfer clutch in order to transmit power to a rear wheel; and a front wheel output shaft that is coupled to said transfer shaft in order to transmit power to a front wheel.

6. The power transmission apparatus for a hybrid vehicle according to claim 3, wherein said output transmission shaft comprises:

a transfer shaft that is coupled to said second one-way clutch so as to be coaxial with said motor output shaft;

a rear wheel output shaft that is coupled to said transfer shaft via a transfer clutch in order to transmit power to a rear wheel; and a front wheel output shaft that is coupled to said transfer shaft in order to transmit power to a front wheel.

\* \* \* \* \*